Figure 1:
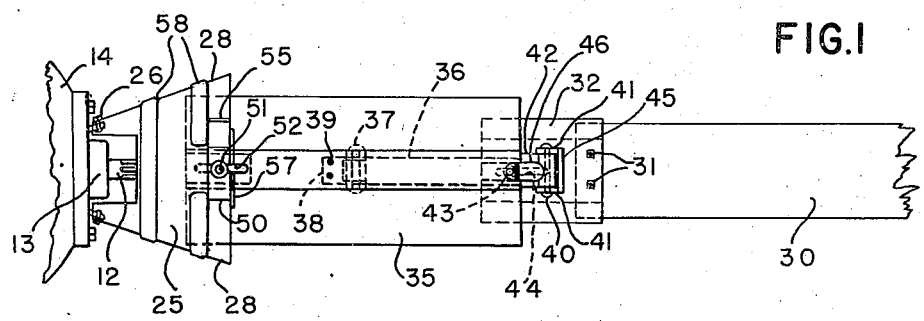

Nov. 5, 1946.　　　　E. T. JOHNSON　　　　2,410,503

SAFETY SHIELD

Filed April 19, 1945

WITNESS.
Clifford Zude

INVENTOR.
E. T. JOHNSON

Patented Nov. 5, 1946

2,410,503

UNITED STATES PATENT OFFICE 2,410,503

SAFETY SHIELD

Ellsworth T. Johnson, Moline, Ill., assignor to Deere & Company, Moline, Ill., a corporation of Illinois Application April 19, 1945, Serial No. 589,122

8 Claims. (Cl. 280—33.44)

The present invention relates generally to safety shields and more particularly to protective shielding for power shafts, with particular reference to power shaft connections between two coupled vehicles, such as, for example, a farm tractor and a trailing implement coupled thereto.

The principal object of my invention has to do with the provision of a protective shielding for a power shaft connection between two coupled vehicles, which is flexibly jointed to provide for both vertical and horizontal relative movement between the two vehicles, and yet is light in weight and inexpensive to manufacture.

A more specific object of my invention relates to the provision of a shield which is easily removable to gain access to the power shaft connection for the purpose of coupling or uncoupling the vehicle.

Heretofore, shielding devices of this general class have included a pair of shields for the implement and the tractor, respectively, mounted more or less permanently over the sections of power shaft associated therewith, and a removable interconnecting shield is provided to bridge the space between the vehicle mounted shields, and to cover the flexible joints through which the two power shaft sections are coupled. However, removable shields have the disadvantage that it is a temptation for the operator to leave them off, in order to save time when coupling an implement to a tractor, confident that since most of the power shaft is covered by shielding, the short section between the two vehicles will be of little importance. This feeling of over confidence, however, is not justified by accident statistics over the past few years, for it has been found most important to protect the operator from the rotating universal joints and power shaft connections, which are more dangerous than lengths of smooth power shaft.

A more specific object of my invention, therefore, has to do with the provision of an interconnecting shield between the two vehicles, which is permanently connected to the shield on one of the vehicles in order that it cannot readily be removed therefrom, but which is quickly and easily shiftable to an open position which provides unobstructed access to the power shaft connections, and which is just as easily shifted back into normal operating or protective position over the power shaft. A related object has to do with providing a suitable stop to prevent the movable section of shield from folding back neatly against one of the vehicle mounted shields, which encourages the operator to operate the implement with the connecting shield folded back in open position. My invention has been devised upon the theory that if the movable section of shield cannot be readily detached and set aside, or swung back to an out of the way position, but which can easily be shifted into operating position and latched therein without the necessity for replacing bolts or screws, operators will then be encouraged to operate their machines with the protective shields in place, thereby saving lives and minimizing accidents.

In the accomplishment of these objects, the problem has been somewhat complicated by the fact that the power shafts of some tractors are disposed beneath the operator's platform in a position which prevents the removable section of shield from being merely hinged to the stationary shielded section on the implement, for vertical swinging movement. Therefore, another specific object of my invention relates to the provision of a connection between the movable and stationary sections of shield, which permits a longitudinal sliding movement as well as a vertical swinging movement.

Figure 2:
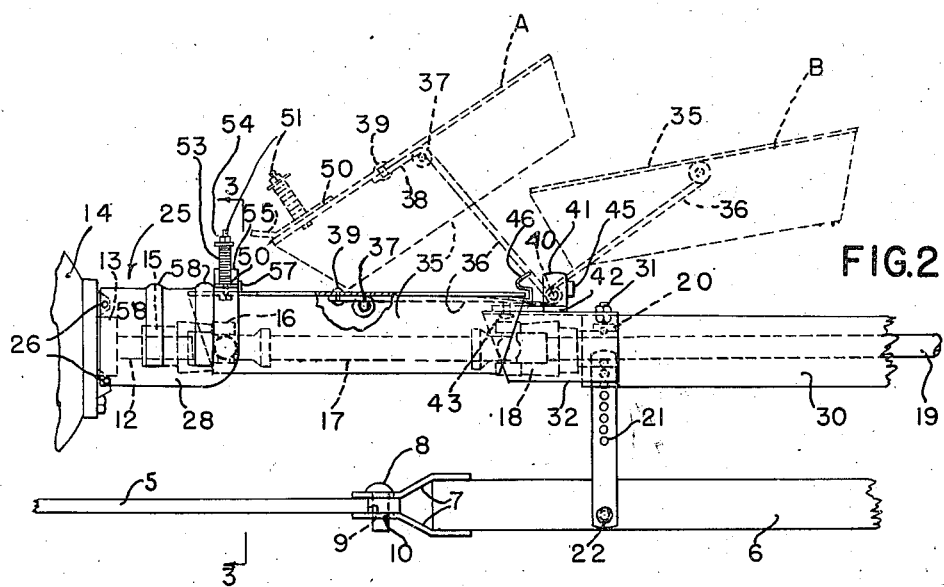
Figure 3:
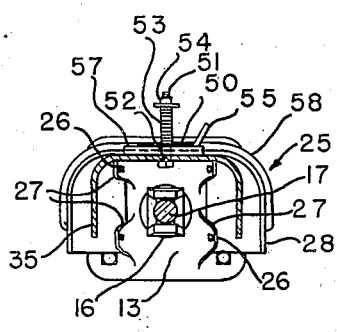

These and other objects and advantages of my invention will be apparent to those skilled in the art after a consideration of the following description, in which reference is had to the drawing appended hereto, in which Figure 1 is a plan view of a pair of vehicle mounted shield sections interconnected by an interconnecting shield section embodying the principles of my invention;

Figure 2 is a side elevational view showing the draft connections between the vehicles and also the power shaft connection, a portion of the movable shield being broken away to expose the hinge connection; and Figure 3 is a sectional elevational view taken along the line 3—3 in Figure 2.

Referring now to the drawing, the tractor is represented by a tractor drawbar 5, while the trailing implement is represented by a draft tongue 6 provided with a hitch device comprising a pair of strap irons 7 fixed to the forward end of the tongue 6 and extending forwardly in vertically spaced relation to receive therebetween the tractor drawbar 5. The strap irons 7 and the drawbar 5 are provided with vertically aligned apertures to receive a coupling pin 8, providing for free horizontal swinging movement of the tractor drawbar 5 and draft tongue 6 relative to each other during operation, and the apertures 9, 10 in the drawbar and draft tongue, respectively, are sufficiently loose around the coupling pin 8 to permit a limited amount of vertical angular movement therebetween.

The tractor power takeoff shaft is indicated by reference numeral 12 and extends rearwardly from a supporting bearing 13 mounted on the rear of the tractor axle housing 14. The power takeoff shaft 12 is splined to receive an internally splined hub 15 of a universal joint 16, which is attached to a short connecting shaft 17, which extends rearwardly over the coupling pin 8 and is connected at its rear end through a universal joint 18 to a fore and aft extending power shaft 19, which is connected to drive mechanism on the implement in a well known manner. The shaft 19 is journaled at its forward end in a bearing 20, which is carried on a supporting standard 21, which is pivotally connected by a transverse bolt 22 to the implement draft tongue 6 and extends vertically therefrom. Preferably, the power shaft 19 is made in telescoping sections to permit the shaft to have a certain amount of extensibility, to accommodate vertical angular movement between the implement and the tractor, as explained more in detail in Patent 2,349,-923 granted May 30, 1944, to Anderson et al.

Coming now to that part of the structure with which my invention is more particularly concerned, the tractor power takeoff shaft 12 is provided with a sheet metal shield 25, which is bolted by several bolts 26 to lugs 27 formed integrally with the bearing 13. The shield 25 is formed in an inverted U-shape, with the bottom open, thereby protecting the top and sides of the power takeoff shaft 12. The shield 25 has side walls 28 which diverge rearwardly from the supporting bolts at the forward end of the shield.

The implement power shaft 19 is protected by an inverted channel shaped sheet metal shield 30, covering the top and sides of the power shaft 19 but open at the bottom. The shield 30 is mounted at its forward end on the bearing housing 20 and is secured thereto by bolts 31. A short section 32 of the inverted channel shaped shield is also rigidly attached to the bearing 20 by the bolts 31 and extends forwardly therefrom over the universal joint 18.

With the tractor and implement coupled together, the two vehicle mounted shields 25, 30 are disposed in alignment, but terminate in longitudinally spaced relation. The space between the two shield sections is occupied by an interconnecting shield 35. The shield 35 is also made of inverted channel shaped sheet metal, which is somewhat wider than the extension 32 of the implement shield 30 and lies over the latter with sufficient room between the side walls of the shield 35 and the side walls of the shield 32 to permit relative lateral swinging movement therebetween. The forward end of the channel shaped shield 35 extends into the rearwardly diverging end of the power takeoff shaft shield 25, the latter being sufficiently wider than the shield 35 to permit relative lateral swinging movement, such as when the tractor turns a corner.

The shield 35 is permanently mounted on the shield section 32 by means of a swingable link 36, which is hinged on a transverse hinge pin 37 to a mounting plate 38 connected by rivets 39 to the top of the shield intermediate the ends thereof. The other end of the link 36 is connected by a hinge pin 40 to a pair of lugs 41 fixed to a supporting plate 42. The plate 42 is pivotally connected to the top of the shield section 32 by means of a pivot bolt 43 extending vertically through aligned apertures in the shield 32 and the plate 42, the aperture 44 in the shield 32 being elongated longitudinally to provide a slot within which the pivot bolt 43 is slidable longitudinally, permitting the plate 42, link 36, and interconnecting shield 35 to slide fore and aft relative to the implement mounted shields 30, 32, and at the same time permitting a lateral swinging movement thereof about the vertical axis of the pivot bolt 43 relative to the shields 30, 32.

In Figure 2, the shield 35 is shown in solid lines in its normal operating position, while in dotted lines the shield is shown in position A in partly raised position, indicating the manner in which the shield can be swung upwardly and rearwardly away from the power shaft section 17 and universal joints 16, 18, providing free access to the latter. In position B the shield is shown in completely raised position, in which the space between the shields 25, 30 is unobstructed for the purpose of working on the power shaft connections. Although it would be possible to swing the link 36 in a clockwise direction until it rests on the shield 30, allowing the interconnecting shield 35 to straddle the shield 30, this is undesirable for it would encourage the operator to leave the shield in this position during operation, and therefore I provide a stop in the form of a transverse bar 45 welded between the rear edges of the lugs 41 so as to engage the link 36 to hold the latter in a rearwardly inclined position, thereby supporting the shield 35 in a raised position over the implement shield 30, as indicated in position B. In this position, the shield is brought to the operator's attention, so that after connecting the power shaft he would be inclined to replace the interconnecting shield 35 in its protective position, shown in solid lines in Figure 2.

As the shield 35 is swung downwardly from the intermediate position A to the operating position shown in solid lines, the rear edge of the shield 35 engages a spring latch 46, which is fixed, as by welding, to the top of the link member 36 behind the edge of the shield. This latch 46 holds the shield 35 down in its normal operating position.

The forward end of the shield 35 is provided with a detachable spring latch member 50 secured to the top of the shield 35 by means of a bolt 51 extending vertically through an aperture in the latch 50 and through a longitudinally extending slot 52 in the top of the shield 35. A compression spring 53 encircles the bolt 51 and is compressed between a nut 54 on the end of the bolt and the latch 50, thereby urging the latter down upon the top of the shield 35. One end of the latch plate 50 is turned upwardly, as indicated at 55, in inclined relation to the latch 50 for the purpose of sliding the latch over the top of the tractor power takeoff shield 25 as the interconnecting shield 35 is swung down into operating position. The rear edge of the shield 25 is turned upwardly at 57 to provide a vertical flange over which to engage the latch 50.

The interconnecting shield 35 is easily swung into operating position, with the latch 50 turned with its inclined portion 55 extending forwardly in order that the latter engage the top of the flange 57 and slide over the latter as the front end of the shield 35 is slid under the shield 25. It is now a simple matter to turn the latch plate 50 laterally so that it drops into a groove or recess between the flange 57 and a transversely extending bulge 58, of which there are two formed transversely in longitudinally spaced relation in the shield 25. After the top edge of the shield 35 is inserted under the shield 25, the rear edge of the shield 35 is pressed down into engagement with the spring latch 46. The shields are now in operating position and it will be evident that the interconnecting shield 35 is pivotable about the bolt 51 relative to the forward shield 25, and also pivotable about the bolt 43 relative to the rear shield 32. The shields are extensible to accommodate the necessary extension or contraction of the shield when the tractor and implement go over a hump or down through a gulley. At such times, the shields 25, 30 move toward and away from each other, thereby shifting the bolts 51, 43 within the slots 52 and 44, respectively.

When it is desired to gain access to the power shaft, the latch 50 is turned longitudinally of the shield 35, with the inclined end 55 pointing rearwardly, and then the rear edge of the shield is first raised after moving the latch 46 out of engagement therewith, after which the shield 35 can be slid rearwardly together with its supporting plate 42, relative to the shield section 32, and also swung upwardly on its link 36 to disengage it from the rear edge of the shield 25, after which the shield 35 and link 36 are swung rearwardly until the link engages the stop 45.

I do not intend my invention to be limited to the exact details shown and described herein, except as set forth in the claims which follow.

I claim:

1. Protective shielding for a power shaft connection between two coupled vehicles, comprising in combination, a pair of shields mounted on said vehicles, respectively, adapted to be disposed in aligned, spaced relation, an interconnecting shield between said pair of shields, means permanently connecting said interconnecting shield to one of said vehicle mounted shields providing for longitudinal shifting and lateral swinging movement of said interconnecting shield relative thereto, and disengageable means connecting said interconnecting shield with the other of said vehicle mounted shields.

2. Protective shielding for a power shaft connection between two coupled vehicles, comprising in combination, a pair of shields mounted on said vehicles, respectively, adapted to be disposed in aligned, spaced relation with said vehicles in coupled relation, an interconnecting shield between said pair of shields, hinge means connecting said interconnecting shield to one of said vehicle mounted shields providing for relative vertical movement therebetween and including a longitudinally slidable connection permitting longitudinal shifting movement of said interconnecting shield relative to said one vehicle mounted shield, and detachable means connecting said interconnecting shield with the other of said vehicle mounted shields.

3. Protective shielding for a power shaft connection between two coupled vehicles, comprising in combination, a pair of shields mounted on said vehicles, respectively, adapted to be disposed in longitudinally aligned, spaced relation, an interconnecting shield between said pair of shields, hinge means connected to said interconnecting shield and movable about a transverse axis, a vertical pivot bolt extending through apertures in said hinge means and one of said vehicle mounted shields, one of said apertures being elongated longitudinally to provide for longitudinal shifting movement of said interconnecting shield relative to its associated vehicle shield and for relative lateral swinging movement, and disengageable means connecting said interconnecting shield with the other of said vehicle mounted shields.

4. Protective shielding for a power shaft connection between two coupled vehicles, comprising in combination, a pair of shields mounted on said vehicles, respectively, adapted to be disposed in longitudinally aligned, spaced relation, an interconnecting shield between said pair of shields, hinge means connected to said interconnecting shield and movable about a transverse axis, a vertical pivot bolt extending through apertures in said hinge means and one of said vehicle mounted shields, one of said apertures being elongated longitudinally to provide for longitudinal shifting movement of said interconnecting shield relative to its associated vehicle shield and for relative lateral swinging movement, and disengageable means connecting said interconnecting shield with the other of said vehicle mounted shields, said disengageable means providing for relative longitudinal sliding movement and for relative lateral swinging movement between the two last-mentioned shields.

5. Protective shielding for a power shaft connection between two coupled vehicles, comprising in combination, a pair of shields mounted on said vehicles, respectively, adapted to be disposed in longitudinally aligned, spaced relation, an interconnecting shield between said pair of shields, a link arm hinged to said interconnecting shield and to one of said vehicle mounted shields at opposite ends of said arm, respectively, providing for swinging movement about transverse axes, one of said hinges being connected to its associated shield by lost motion means permitting a limited amount of relative longitudinal movement therebetween.

6. Protective shielding for a power shaft connection between two coupled vehicles, comprising in combination, a pair of shields mounted on said vehicles, respectively, adapted to be disposed in longitudinally aligned, spaced relation, an interconnecting shield between said pair of shields, a link arm hinged to said interconnecting shield and to one of said vehicle mounted shields at opposite ends of said arm, respectively, providing for swinging movement about transverse axes, one of said hinges being connected to its associated shield by lost motion means permitting a limited amount of relative longitudinal movement therebetween, and disengageable latch means disposed at each end of said interconnecting shield for securing the latter to said vehicle mounted shields.

7. Protective shielding for a power shaft connection between two coupled vehicles, comprising in combination, a pair of shields mounted on said vehicles, respectively, adapted to be disposed in longitudinally aligned, spaced relation, an interconnecting shield between said pair of shields, a link arm having one end hinged to the inner side of said interconnecting shield and the other end hinged to a connecting plate, providing for pivotal movement of said arm about transverse axes, a pivot bolt extending through aligned apertures in said plate and in one of said vehicle mounted shields providing for relative lateral swinging movement therebetween, one of said apertures being elongated longitudinally to provide for relative longitudinal sliding movement therebetween, and latch means disengageably connecting the other end of said interconnecting shield with the other of said vehicle mounted shields.

8. The combination set forth in claim 7, including the further provision of a stop for limiting the swinging movement of said link means to prevent said interconnecting shield from being folded back upon the vehicle mounted shield associated therewith.

ELLSWORTH T. JOHNSON.

Disclaimer 2,410,503.—*Ellsworth T. Johnson*, Moline, Ill. SAFETY SHIELD. Patent dated Nov. 5, 1946. Disclaimer filed Nov. 19, 1947, by the assignee, *Deere & Company*.
Hereby enters disclaimer to claim 1 of said patent.
[*Official Gazette January 6, 1948.*]